United States Patent
Rozenblit

(10) Patent No.: US 11,113,892 B2
(45) Date of Patent: Sep. 7, 2021

(54) METHOD AND APPARATUS FOR ON-LINE AND OFF-LINE RETAIL OF ALL KIND OF CLOTHES, SHOES AND ACCESSORIES

(71) Applicant: Vladimir Rozenblit, Houston, TX (US)

(72) Inventor: Vladimir Rozenblit, Houston, TX (US)

(*) Notice: Subject to any disclaimer, the term of this patent is extended or adjusted under 35 U.S.C. 154(b) by 0 days.

(21) Appl. No.: 16/827,727

(22) Filed: Mar. 24, 2020

(65) Prior Publication Data
US 2020/0327735 A1    Oct. 15, 2020

Related U.S. Application Data

(60) Provisional application No. 62/823,000, filed on Mar. 25, 2019.

(51) Int. Cl.
| | | |
|---|---|---|
| G06T 19/00 | (2011.01) | |
| G06Q 30/06 | (2012.01) | |
| G06T 17/00 | (2006.01) | |

(52) U.S. Cl.
CPC ....... *G06T 19/006* (2013.01); *G06Q 30/0625* (2013.01); *G06Q 30/0643* (2013.01); *G06T 17/00* (2013.01); *G06T 2200/24* (2013.01)

(58) Field of Classification Search
CPC ... G06T 19/006; G06T 17/00; G06T 2200/24; G06Q 30/0625; G06Q 30/0643
See application file for complete search history.

(56) References Cited

U.S. PATENT DOCUMENTS

| | | | | |
|---|---|---|---|---|
| 7,027,050 B1 * | 4/2006 | Dunnett | ................... | G06T 17/20 345/440 |
| 9,477,980 B2 * | 10/2016 | Zagel | ................... | A63F 13/35 |
| 9,996,981 B1 * | 6/2018 | Tran | ................... | G06K 9/4671 |
| 2007/0130020 A1 * | 6/2007 | Paolini | ................... | G06Q 30/0643 705/26.62 |
| 2009/0144173 A1 * | 6/2009 | Mo | ................... | G06T 19/00 705/26.1 |
| 2010/0111370 A1 * | 5/2010 | Black | ................... | G06K 9/00369 382/111 |
| 2017/0262134 A1 * | 9/2017 | Eriksson | ................... | G06F 3/017 |
| 2018/0047083 A1 * | 2/2018 | Agarwal | ................... | G06Q 30/0631 |
| 2018/0300791 A1 * | 10/2018 | Ganesan | ................... | G06Q 30/0601 |
| 2020/0020165 A1 * | 1/2020 | Tran | ................... | G06N 7/005 |

(Continued)

FOREIGN PATENT DOCUMENTS

| | | |
|---|---|---|
| WO | 01/46911 | 6/2001 |
| WO | 10/096878 | 9/2010 |

OTHER PUBLICATIONS

FaceCake ("New Technology Lets You Try on Virtual Clothes Before You Buy", 2013, https://www.youtube.com/watch?v=_1GyAO5IFpE) (Year: 2013).*

(Continued)

*Primary Examiner* — Xin Sheng
(74) *Attorney, Agent, or Firm* — Reches Patent

(57) ABSTRACT

A method for three-dimension (3D) based shopping, the method may include receiving or generating a 3D representation of at least a part of a body of a certain customer; receiving a query to find a first wearable item that fits the part of the body; searching for the first wearable item; displaying on a display that is accessible to the certain customer a 3D model of the first wearable item when worn over the part of the body; and interacting with the certain customer till a completion of the 3D based shopping.

26 Claims, 10 Drawing Sheets

(56) References Cited

U.S. PATENT DOCUMENTS

2020/0066029 A1* 2/2020 Chen .................... G06T 7/70
2020/0135310 A1* 4/2020 Gedamu ............... G16H 50/70

OTHER PUBLICATIONS

Kinect ("Kinect for Windows Retail Clothing Scenario Video", 2013, https://www.youtube.com/watch?v=Mr71jrkzWq8) (Year: 2013).*
CNET ("Naked Labs Body Scanner review: This mirror sees it all", 2018, https://www.youtube.com/watch?v=9sTzLlyedVk) (Year: 2018).*

* cited by examiner

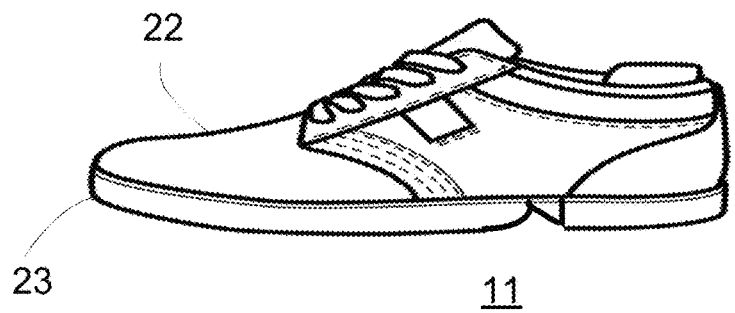
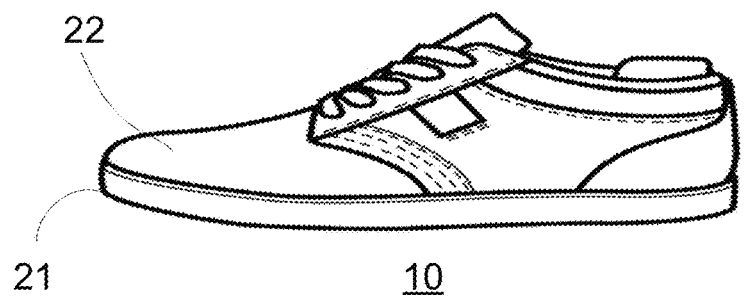
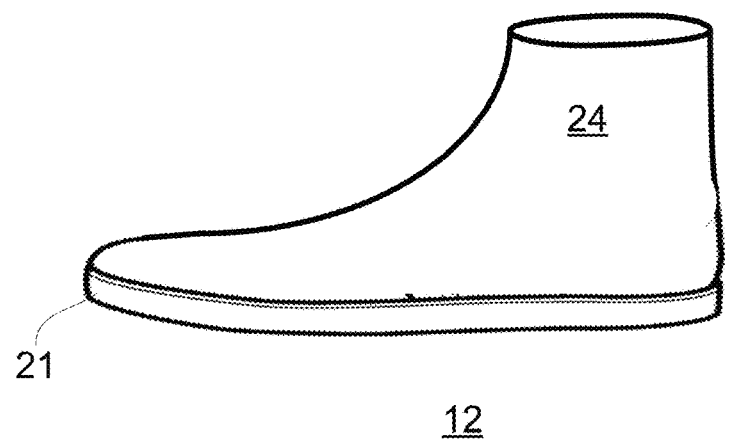
FIG. 5

```
┌──────────────────┐          ┌──────────────────────┐
│ Final 3D model of│          │ 3D Model of the part │
│  Customer body   │          │        for sale      │
└──────────────────┘          └──────────────────────┘

┌─────────────────────┐
            │ Presenting two models:│
            │     Separately or    │
            │      Overlapped      │
            └─────────────────────┘

┌─────────────────────┐
            │ Emphasizing differences│
            └─────────────────────┘

┌──────────┐              ┌──────────┐
       │ Decision │              │  Saving  │
       └──────────┘              └──────────┘

┌──────────┐
       │Proceeding│
       └──────────┘

┌──────────────────┐
       │ Back to the NEXT part │
       └──────────────────┘
```

FIG. 8

METHOD AND APPARATUS FOR ON-LINE AND OFF-LINE RETAIL OF ALL KIND OF CLOTHES, SHOES AND ACCESSORIES

CROSS-REFERENCE

This application claims priority from U.S. provisional patent 62/823,000 filing date Mar. 25, 2019 which is incorporated herein by reference.

BACKGROUND

On line purchasing of different kinds of clothes, shoes and accessories significantly affected by lucking information or/and miss representation of parts for sale and missing ability of customer to ensure any kind of matching between a part and it real body parameters. This is especially actual for customers having parameters, slightly different from "ideal".

Market available two-dimensional (2D) scanners expensive [from $25K to $60K] and at such high price cannot be used for target market [retail].

Market available SW and algorithms for three-dimensional (3D) modeling limited to Industrial, Healthcare, Science, Art and Design fields and as such cannot be used for the target market [retail].

SUMMARY

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description may be not limited to the disclosed embodiments and examples.

There may be provided a method for three-dimension (3D) based shopping, the method may include receiving or generating a 3D representation of at least a part of a body of a certain customer; receiving a query to find a first wearable item that fits the part of the body; searching for the first wearable item; displaying on a display that may be accessible to the certain customer a 3D model of the first wearable item when worn over the part of the body; and interacting with the certain customer till a completion of the 3D based shopping.

The at least part of the body may include the part of the body and at least one other part of the body; wherein the method may include searching, following a finding of the first wearable item, for at least one additional wearable item that may fit the at least one other part of the body; and displaying on the display a 3D model of the at least one additional wearable item when worn over the at least one other part of the body.

The searching for the at least one additional wearable item may include searching for at least one additional wearable item that may be associated with the first wearable item.

The method may include searching for non-worn items associated with the first wearable item and displaying information about the non-worn items to the user.

The interacting may include receiving feedback from the certain customer and updating a certain customer profile based on the feedback.

The searching may be based on a certain customer profile.

The method may include receiving images of the at least one part of the body of the certain customer and generating, based on the images, the 3D representation of at least part of the body of the certain customer.

The searching may include comparing dimensional information related to the first wearable item and to dimensional information related to the part of the body of the certain customer.

The searching may include utilizing machine learning processes.

The first wearable item may be selected from a footwear and a cloth.

The first wearable item may be a configurable wearable item; and wherein the method may include configuring, upon completion of the 3D based shopping, the first wearable item to fit the part of the body of the certain customer.

The first wearable item may be a 3D printer generated wearable item; and wherein the method may include 3D printing, upon completion of the 3D based shopping, the first wearable item to fit the part of the body of the certain customer.

There may be provided a non-transitory computer readable medium for three-dimension (3D) based shopping, the non-transitory computer readable medium that may store instructions for receiving or generating a 3D representation of at least a part of a body of a certain customer; receiving a query to find a first wearable item that fits the part of the body; searching for the first wearable item; displaying on a display that may be accessible to the certain customer a 3D model of the first wearable item when worn over the part of the body; and interacting with the certain customer till a completion of the 3D based shopping.

The at least part of the body may include the part of the body and at least one other part of the body; wherein the non-transitory computer readable medium may store instructions for searching, following a finding of the first wearable item, for at least one additional wearable item that may fit the at least one other part of the body; and displaying on the display a 3D model of the at least one additional wearable item when worn over the at least one other part of the body.

The non-transitory computer readable medium 8 wherein the searching for the at least one additional wearable item may include searching for at least one additional wearable item that may be associated with the first wearable item.

The non-transitory computer readable medium that may store instructions for searching for non-worn items associated with the first wearable item and displaying information about the non-worn items to the user.

The interacting may include receiving feedback from the certain customer and updating a certain customer profile based on the feedback.

The searching may be based on a certain customer profile.

The non-transitory computer readable medium that may store instructions for receiving images of the at least one part of the body of the certain customer and generating, based on the images, the 3D representation of at least part of the body of the certain customer.

The searching may include comparing dimensional information related to the first wearable item and to dimensional information related to the part of the body of the certain customer.

The searching may include utilizing machine learning processes.

The first wearable item may be selected from a footwear and a cloth.

The first wearable item may be a configurable wearable item; and wherein the non-transitory computer readable medium may store instructions for configuring, upon completion of the 3D based shopping, the first wearable item to fit the part of the body of the certain customer.

The first wearable item may be a 3D printer generated wearable item; and wherein the non-transitory computer readable medium may store instructions for 3D printing, upon completion of the 3D based shopping, the first wearable item to fit the part of the body of the certain customer.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 5 illustrates a kit;
FIG. 8 is as an example of a method.

DETAILED DESCRIPTION OF THE DRAWINGS

Figure 1:
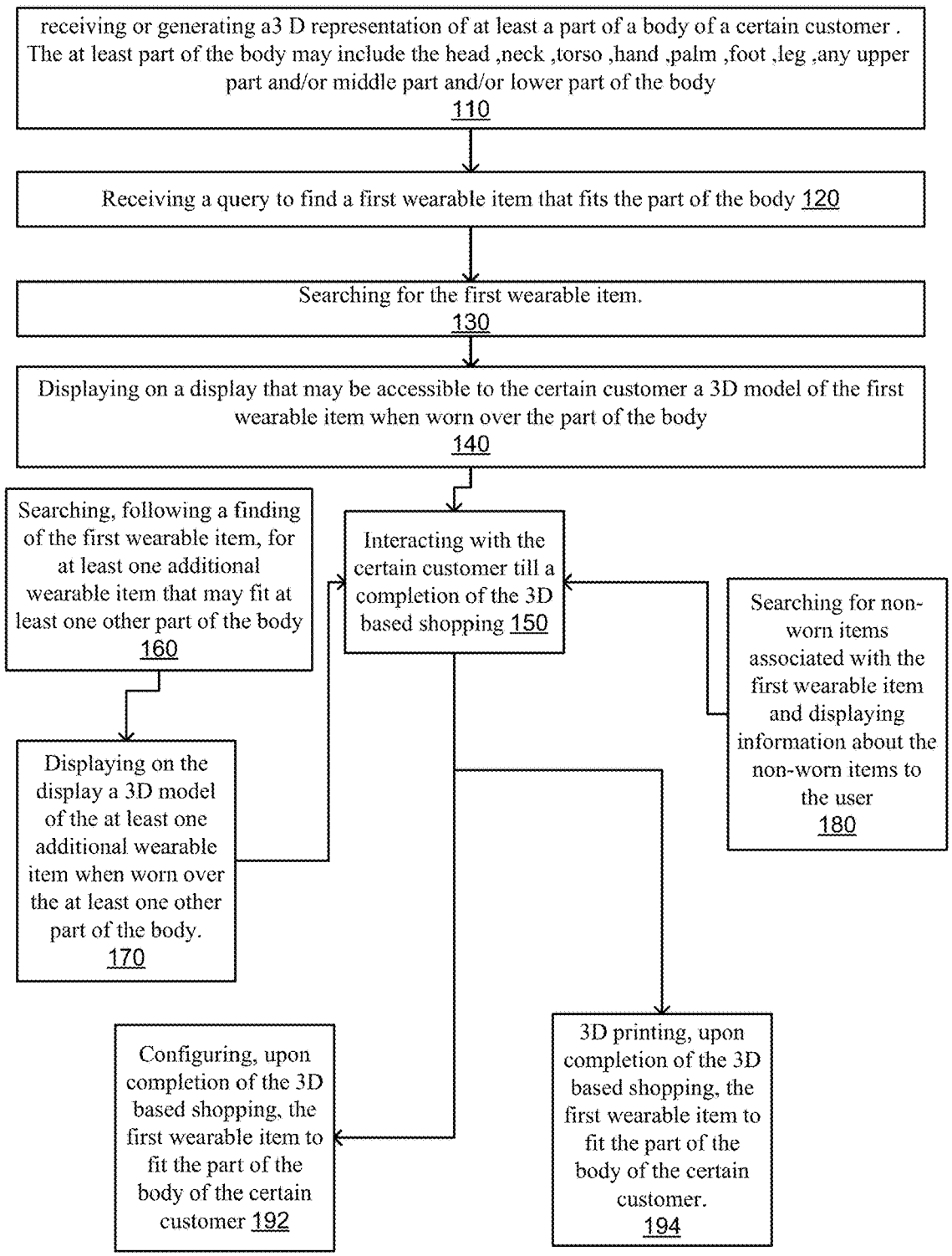
FIG. 1 is as an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

There is provided a system, method and computer readable medium (that is non-transitory) that may facilitate on-line shopping based on three dimensional models of a body of a customer (or of relevant parts of the customer).

These system, method and computer readable medium may ensure correct and close-to-real representation of the item and enhanced and true information regarding matching of the selected parts and customer parameters or/and requests.

The terms representation and model are used in an interchangeable manner.

The terms camera and scanner are used in an interchangeable manner. A scanner may include a camera and/or a depth sensor.

A wearable item may be a cloth, a footwear and the like.

FIG. 1 illustrates an example of method 100.

Method 100 is for three-dimension (3D) based shopping.

Method 100 may start by step 110 of receiving or generating a 3D representation of at least a part of a body of a certain customer. The at least part of the body may include the head, neck, torso, hand, palm, foot, leg, any upper part and/or middle part and/or lower part of the body.

Thus—step 110 may include receiving the 3D representation or generating the 3D representation.

The generating of the 3D representation may include receiving images of the at least part of the body. The images may be taken from different angles and the angular information (regarding the angles) may be explicitly or implicitly provided.

The 3D representation may include any type of information that may indicate of the 3D body part. It may include visual information and/or non-visual information. For example the 3D representation may include a set of coordinates that reflect the exterior shape of the at least one part of the body, or any other mathematical and/or visual model.

Step 110 may include creating the 3D representation by simple measurements according to the instruction. Most available, affordable and less precise.

Step 110 may include creating the 3D representation by different kind of scanners Step 110 may include creating the 3D representation by by wearable "overall", concluding special measurement sensors, located in the right places and allowed precise measurements. Wearable "overall" can be from for onetime disposable until more prestige's models for personal using along the time. Sensors can be integrated inside the wearable "overall" for long time using and alternatively can be separated from the overall and "installed" at the right places only for the time and purposes of measurement [remains in possession of retailer]. All sensors will wirelessly transfer real data to the central computer and appropriated algorithms will translate these data into measurement units and 3D model. These measurements and 3D model can be used for purchase according to the present invention. Alternatively these measurements and 3D model can be used by specially designed for PC or/and smartphones applications for long time monitoring of body parameters and trends. Such use is especially attractive for those populations, who monitoring weight or/and other body parameters for the purposes of monitoring, control, feedback, research, etc.

during various procedures, related to food consumption or/and physical training/activities Step 110 may be followed by step 120 of receiving a query to find a first wearable item that fits the part of the body.

The query received in step 120 may be explicitly state that type of the first wearable item (for example—please find me a shirt) and/or may implicitly indicate the type of the first wearable item (for example—find may a wearable item that will fit a certain part of the body—or even find one or more wearable items that fit any part of the body that is included in the 3D representation).

The first wearable item may be selected from a footwear and a cloth.

The query may also list one or more properties of the first wearable item such as color, material, thickness, durability, softness, texture, a fit parameters (such as—tightly fit the part of the body, loosely fit the part of the body, and the like).

Step 120 may be followed by step 130 of searching for the first wearable item. The search is based, at least in part on the one or more properties listed in the query (if such one or more properties were indeed listed).

Step 130 may be followed by step 140 of displaying on a display that may be accessible to the certain customer a 3D model of the first wearable item when worn over the part of the body.

Step 140 may include using Virtual Reality [VR] in order to present customer various options based on it 3D model various parts-for-sale. VR is the computer-generated simulation of a three-dimensional image or environment that can be interacted with in a seemingly real or physical way by a person using special electronic equipment, such as a helmet with a screen inside or gloves fitted with sensors Step 140 may include using Augmented Reality [AR] in order to present customer various options based on it 3D model various parts-for-sale. AR means a technology that superimposes a computer-generated image on a user's view of the real world, thus providing a composite view. Augmented reality is technology that combines virtual reality with the real world in the form of live video imagery that is digitally enhanced with computer-generated graphics. AR can be experienced through headsets that people wear and through displays on mobile devices The difference between VR and AR: Augmented reality (AR) adds digital elements to a live view often by using the camera on a smartphone. Examples of augmented reality experiences include Snapchat lenses and the game Pokémon Go. Virtual reality (VR) implies a complete immersion experience that shuts out the physical world.

The Basics of How VR Works: The primary subject of virtual reality is simulating the vision. Every headset aims to perfect their approach to creating an immersive 3D environment. Each VR headset puts up a screen (or two—one for each eye) in front of eyes thus, eliminating any interaction with the real world The goal of Augmented Reality is to create a system in which the user cannot tell the difference between the real world and the virtual augmentation of it. Today Augmented Reality is used in entertainment, military training, engineering design, robotics, manufacturing and other industries AR makes the existing reality more meaningful because it allows to interact with it. Augmented reality has a great potential to be used in the classroom because it changes the way students interact with the real world, enhances student engagement, and makes the learning of their subject content a fun.

Step 140 may be followed by step 150 of interacting with the certain customer till a completion of the 3D based shopping. Step 150 may include completing the 3D based shopping.

The interacting may include feedback regarding the first item—whether the first item is desired by the certain customer, whether the first wearable item should be adjusted, whether the first item is not desired and should be replaced by another wearable item, and yet may also include the provision of billing and/or ordering and/or packaging information.

The 3D representation may include a 3D representation of a part of the body that may fit the first wearable item but may also include a 3D representation of other parts of the body.

The interacting may include receiving feedback from the certain customer and updating a certain customer profile based on the feedback.

Method 100 may also include step 160 of searching, following a finding of the first wearable item, for at least one additional wearable item that may fit at least one other part of the body. Step 160 may be followed by step 150.

The at least one additional wearable item may be associated with the first wearable item. The association may indicate that these wearable items fit each other—based on various fashion rules and/or based on an identity of a vendor that supplies the wearable item, and/or based on a predefined association between the wearable items.

The searching of step 160 may be triggered by step 120 (even without an explicit request of the user to perform the search), may be triggered based on any feedback from the user, and may be based on an explicit request from the user.

Step 160 may be followed by step 170 of displaying on the display a 3D model of the at least one additional wearable item when worn over the at least one other part of the body. Step 160 may be followed by step 150.

Method 100 may also include step 180 of searching for non-worn items associated with the first wearable item and displaying information about the non-worn items to the user. Step 180 may be followed by step 150.

The searching of step 180 may be triggered by step 120 (even without an explicit request of the user to perform the search), may be triggered based on any feedback from the user, and may be based on an explicit request from the user.

Any one of steps 130, 160 and 180 may be based on a certain customer profile and/or may include utilizing machine learning processes. The outcome of step Any one of steps 130 and 160 may include comparing dimensional information related to the first wearable item and to dimensional information related to the part of the body of the certain customer.

The first wearable item may be a configurable wearable item. Step 150 may be followed by step 192 of configuring, upon completion of the 3D based shopping, the first wearable item to fit the part of the body of the certain customer.

The first wearable item may be a 3D printer generated wearable item. Step 150 may be followed by step 194 of 3D printing, upon completion of the 3D based shopping, the first wearable item to fit the part of the body of the certain customer.

Method 100 may include creation, saving and sharing of various kind of 2D images from 3D model in various parts-for-sale.

Method 100 may include creation, saving an sharing "books" of customer in various parts-for sale Method 100 may transforms a very boring [dull, tedious, tiresome] procedure of shopping into entertainment.

Figure 2:
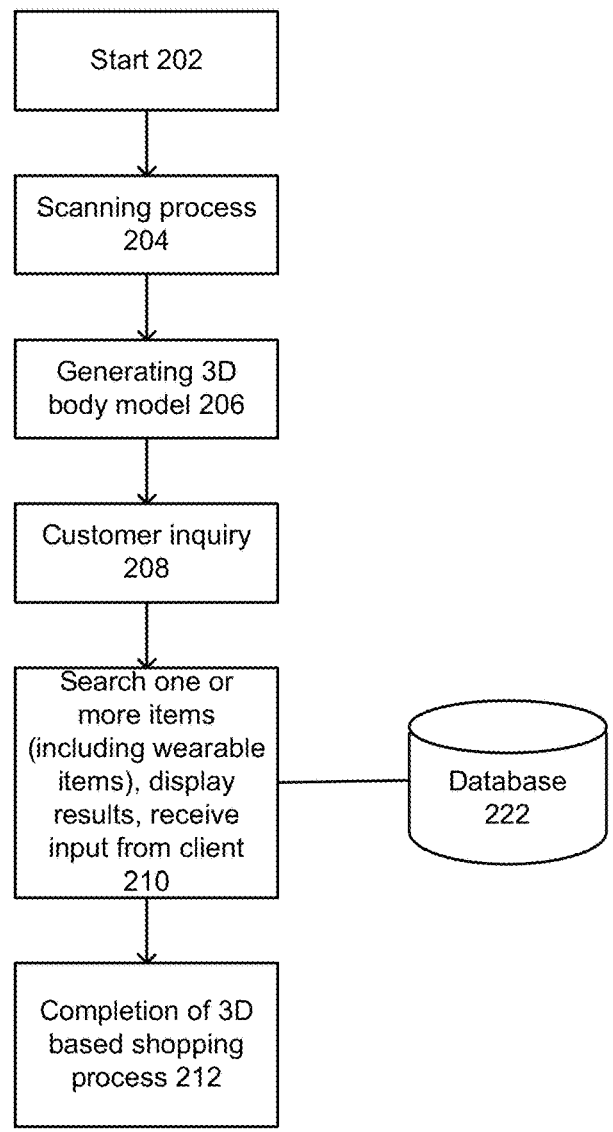
FIG. 2 is as an example of a method.

FIG. 2 illustrates a method 200 that includes starting the 3D based shopping (202).

The method may include performing an on-line [example—from home] 3D shopping.
  a. Customer uses different kinds of scanners in order to create 3D model of the entire body or any part of it. (Scanning process 204).
  b. Scanner should be connected to PC, equipped with special SW application, incorporated IA algorithms
  c. As result of scanning of customer body—full or part, the dedicated SW will create appropriated 3D model (generating 3D body model 206), concluding all necessary measurements
  d. Measurements should consist of at least a list of parameters, used by clothes, shoes and accessory designers to produce each item
  e. Customer upload 3D model to a retail web site and activate one of following operations (customer query 208):
    i. General search will yield customer with all available item, matching it 3D model. The result of such search will be catalogued by part type, color, material type, suggested set of parts, etc.
    ii. Dedicated [customized] search will yield customer with all available item, suitable for the terms and conditions of such search. For example—shirts, ties, shoes, etc. In case the terms of search will provide customer with several types of parts, it can be further catalogued by part type, color, material type, model, etc.
    iii. Select specific item
  f. Using dedicated algorithms and customer Preferences [which can be defined beforehand or collected by the SW along a time], the system performs a comparison between 3D model parameters and search/selection results
  g. Preference might include allowed variation between 3D model parameters and factual parameters of an item.
  h. Then the System will present to customer parts-for-sale, fully matched to it 3D model and optionally—parts-for-sale found within allowed variations. In this case, the Systems will emphasize [by color and by text] all necessary adjustments, which should be done in order to ensure full match between item and 3D model. Customer has the options to request such adjustment to be performed by manufacturer before shipment or request shipment of the item as is.
  i. The System will memorized each session (in other database 222) for improvement of customer Preferences and providing correct record regarding each interaction. In order to provide better and more precise experience to customer, the System will incorporate Self Learning Algorithms
  j. Once the part-for sale is chosen for purchasing, the System will save the results of the session and upload it to the retail web site for further proceeding.

Steps f-i may be included in steps 210 and 212 of FIG. 2.

On-Line Mode of Operation—Apparatus

A Scanner might be specially designed scanner, or any available suitable scanner [available for home and one-hand use] or any suitable smartphone with dedicated application with following major parameters and features:
  a. Accuracy—down to 0.5-1.0 mm.
  b. Angle of FOW—around 22.5 dg.
  c. Covered area:—around 0.5×0.5 m.
  d. Depth of Focus toward scanned surface:
  e. In case of dedicated scanner: 80 cm-100 cm.
  f. In case of smartphone: 10 cm-50 cm.
  g. Distance to Object—around 0.25-0.5 m.
  h. High resolution vs. Large Object scanners.
  i. Illumination—LED and NIR illumination sources [to illuminate existing clothes and hairs and necessity of undressing].
  j. Special features—Image Acquisition, Enhancement and Figures Recognition. Figures may consist different parts of human body, parts of clothes, footwear, accessories, etc.

Off-Line [Example—at Shop] Mode of Operation—Method
  a. Customer uses fit room or other specially designated room with previously installed scanners
  b. Shop Assistant will activate scanner[s] and guide customer in order to create 3D model of it entire body or any part of it.
  c. Scanner should be connected to PC, equipped with special SW application, incorporated IA algorithms
  d. As result of scanning of customer body—full or part, the dedicated SW will create appropriated 3D model, concluding all necessary measurements
  e. Measurements should consist of at least a list of parameters, used by clothes, shoes and accessory designers to produce each item
  f. Shop assistant uploads 3D model to a Shop Data Base and activates one of following operation:
    i. General search, which will yield customer with all available in the Shop item, matching it 3D model. The result of such search will be catalogued by part type, color, material type, suggested set of parts, etc.
    ii. Dedicated [customized] search, which will yield customer with all available item, suitable for the terms and conditions of such search. For example—shirts, ties, shoes, etc. In case the terms of search will provide customer with several types of parts, it can be further catalogued by part type, color, material type, model, etc.
    iii. Select specific item
  g. Using dedicated algorithms and customer Preferences [which can be defined beforehand or collected by the SW along a time], the system performs comparison between 3D model parameters and search/selection results
  h. Preference might include allowed variation between 3D model parameters and factual parameters of an item
  i. Then the System will present to customer parts-for-sale, fully matched to it 3D model and optionally—parts-for-sale, found within allowed variations. In this case, the Systems will emphasize [by color and by text] all necessary adjustments, which should be done in order to ensure full match between item and 3D model. Customer has the options to request such adjustment to be performed by Shop before shipment or request shipment with all adjustments later or to ship the item as is.
  j. The System will memorized each session for improvement of customer Preferences and providing correct record regarding each interaction. In order to provide better and more precise experience to customer, the System will incorporate Self Learning Algorithms
  k. Once the part-for sale is chosen for purchasing, the System will save the results of the session and upload it to the Shop Data Base for further proceeding.

Off-Line Mode of Operation—Apparatus

Scanner might be specially designed scanner, or any available suitable scanner [see FIGS. 1 and 2] with following major parameters and features:
a. Accuracy—down to 0.5-1.0 mm
b. Angle of FOW—from 22.5 dg to 45 dg
c. Covered area including vertical scanning mode—at least 2.0×0.8 m
d. Depth of Focus toward scanned surface: 80 cm-100 cm
e. Distance to Object—from 1 m to 2 m
f. High resolution vs. Large Object scanners
g. Illumination—LED and NIR illumination sources [to illuminate existing clothes and hairs and necessity of undressing]
h. Special features—Image Acquisition, Enhancement and Figures Recognition. Figures may consist different parts of human body, parts of clothes, footwear, accessories, etc.

Figure 3:
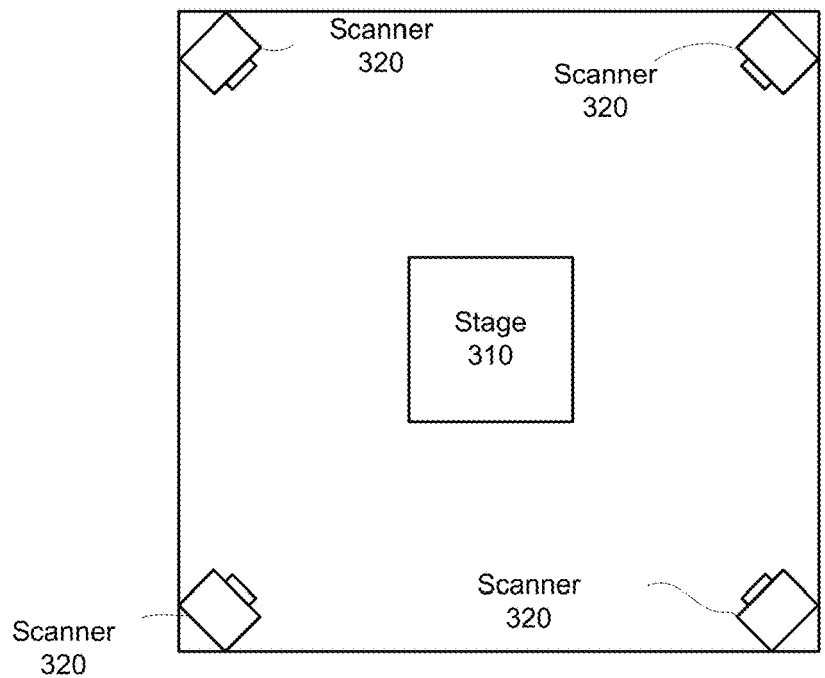
FIG. 3 is as an example of a scanning system.

The scanning system may include (see FIG. 3) a stage 310 on which the customer may stands and multiple scanners 320 that are positioned at different angles in relation to the stage 310.

The scanners may be static or may be moved in relation to the stage—for example may be vertically moved. Any number of movable scanners may be used. The stage may be static or move in relation to the scanners.

Figure 4:
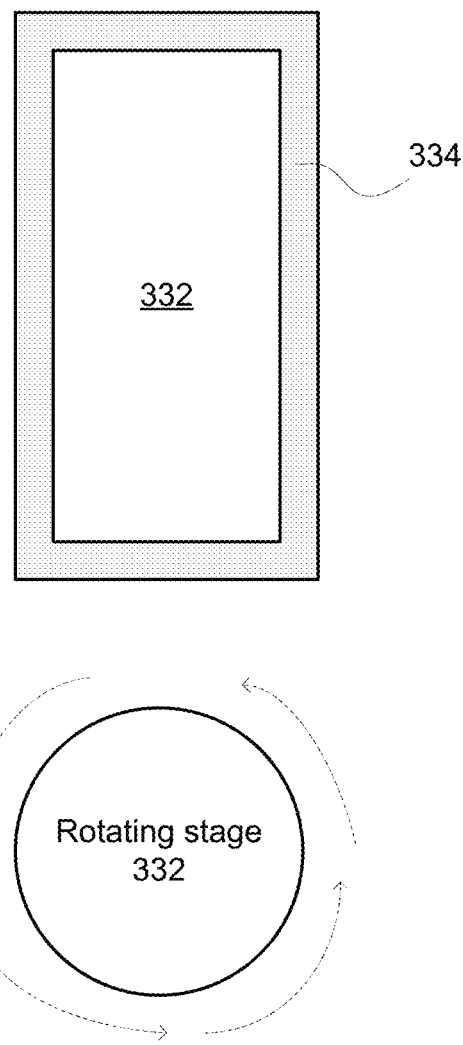
FIG. 4 is as an example of a scanning system.

FIG. 4 illustrates another scanning system that include a rotating stage 332 on which the customer stands. The customer, when standing on the rotating state is within a field of view of an scanning unit that includes mirror 332 (that may be a unidirectional mirror or be a bidirectional mirror), and illumination elements 334. One of more cameras be hidden behind the mirror or may be positioned at any other location and may acquire images of the customer when standing on the rotating stage. Mirror 332 may be replaced by the one or more cameras and/or any optics that may precede the one of more cameras.

There may be provided a method that may include
a. Scanning by different kinds of scanners all necessary parameters of human body or part of it and building of full or partial 3D model for further using and processing
b. Searching in available data bases for all suitable parts of clothes, footwear, accessories matching with 3D model
c. Based on the search results, suggesting customer from single parts-for-sale to full assembly of clothes, footwear, accessories.
d. Presenting to customer his 3D body model [full or part] with suggested parts-for-sale by following means:
  i. On PC or TV screen
  ii. and/or By 3D Hologram
e. In case some specific parameters of clothes, footwear, accessories should be fixed or adjusted, inform customer and propose to perform all necessary adjustments before actual sale or at any other time line acceptable by customer
f. Interact with customer during all steps or searching and matching process with possibility to:
  i. Collect customer feedback at any stage of the process
  ii. Amend customer Preferences and setting by Self learning routines
g. Based on AI Self learning algorithms, the system will provide it suggestions in response on customer feedback
h. The system will collect and suggest retailer all necessary information received from customer 3D model
  i. In turn, retailer performs search in all it available data bases and suggest customer available [or with delayed supply] parts for sale
  j. In order to build sufficient data base and algorithms, retailer receive from suppliers all necessary parameters per each item, required to compare each part with 3D model.

There wearable item may be a shoe that can be assembled from a kit of shoe parts that may be tailored to the foot of the user and may serve multiple functions. Multiple combinations of the shoe parts may provide shoes that differ from each other by functionality. The shoe parts may be fastened or connected together by fasteners or any other means.

The shoe parts may be selected in view of the shape and size of the foot of the person. The foot of the person may be scanned in order to determine the parts of the shoe. Additionally or alternatively, the parts of the shoe may be selected (with or without scanning the foot) based on parameters such age, weight, foot profile of the person and/or based on the function of the shoe (shock absorption requirements, purpose of the shoe—sport, social events . . . ).

Two or more parts of the shoe may be connected to each other to provide a shoe. The kit may include upper parts of the shoe, lower parts of the shoe and even intermediate parts of the shoe.

Wikipedia defines a shoe as including a sole, which is the bottom of a shoe, in contact with the ground. Soles can be simple a single material in a single layer or they can be complex, with multiple structures or layers and materials. When various layers are used, soles may consist of an insole (inner part of the sole—which sits directly under the foot, midsole (between the insole and the outsole), and an outsole (direct contact with the ground).

The insole may be attached to the lasting margin of the upper, which is wrapped around the last during the closing of the shoe during the lasting operation.

The shoe may include removable and replaceable footbeds. The heel is the bottom rear part of a shoe. Its function is to support the heel of the foot. The upper helps hold the shoe onto the foot. Most uppers have a mechanism, such as laces, straps with buckles, zippers, elastic, Velcro straps, buttons, or snaps, for tightening the upper on the foot. The vamp is the front part of the shoe, starting behind the toe, extending around the eyelets and tongue and towards back part of the shoe.

The medial is the part of the shoe closest to a person's center of symmetry, and the lateral is on the opposite side, away from their center of symmetry. This can be in reference to either the outsole or the vamp.

Most shoes have shoelaces on the upper, connecting the medial and lateral parts after one puts their shoes on and aiding in keeping their shoes on their feet.

The toe box is the part that covers and protects the toes.

According to an embodiment of the invention the kit may include parts that are selected out of a sole, an insole, a midsole an outsole, an upper, a heel, a medial, a vamp or a combination of said parts (for example a shoe part may include a heel and an upper).

A kit may include shoe parts that once assembled may provide a single shoe or may allow a user to provide multiple shoes (one at a time).

There kit may include shoe parts that differ from each other by type. Different types of a part may differ from each other by material, style, color, cost, structure, heating capability, durability, design, style, weather durability, and the like. For example the kit may include multiple types of soles-running soles, walking soles, elegant soles, and the like.

The kit may include a one or more interchangeable inserts that are may bridge a gap between the foot and other parts of the shoe.

According to various embodiment of the invention the kit may include:
a. Interchangeable bottom parts that may be designed based on purpose (training—walking, running, trekking, etc.), and/or based on health conditions (age, weight, foot profile, shock absorption, etc.), and/or the presence of absence of an interchangeable insert to be used.
b. Interchangeable inserts may be included in the kit and may be adjusted for bottom part in use from one side and health conditions from other side. Inserts are subject for timely changing in accordance with timely/periodically 3D scan of foots.

The kit may include interchangeable upper parts that are adjusted for various climate conditions, such as sun, rain, dust, sand, etc.

Parts A and C can be easily connected by quick click connectors or a type of connecting element.

FIG. 5 illustrates shoes 10, 11 and 12—shoes 10 and 12 have the same sole 21 but different upper parts 22 and 24 and shoes 10 and 11 have the same upper part but different soles—21 and 23.

In this way user can utilize endless combinations of parts A, B and C for more suitable solutions.

According to an embodiment of the invention there is provided a method that may include receiving information about a foot of a user. This may include 3D scanning and/or receiving less accurate information about the foot (such as size and/or general dimensions) and/or information about the user (age, weight) and/or the purpose of the shoe and manufacturing an d/or retrieving shoe parts that will fit the user.

Today refunding of parts-for-sale, sent back by customer to the seller is high. The major reasons of this is mismatch of purchased part or any other misfit to customer' expectation.

This is inherent phenomena of any internet [remote] retailing process, based on very limited presentation of parts-for-sale without any feedback, based on the real parameters of potential customer and it observation of how the part-for-sale will fit his expectations.

As the results of the proposed method, the quantity of returned parts-for-sale and related amount of refunding will be seriously reduced. This is one of the major positive economical outcomes of proposed method for any retailing business.

Current process of purchase of any part via internet is simple, boring and lucking of any interaction between internet retailing site and potential customer. Such method might be appropriate for selling books, movies and alike, but much less appropriate for purchasing of parts of wearing, accessory, shoe and alike.

Proposed method allow potential customer to create and most important—share between friends directly or by means of any available social network images of himself, wearing potential part, discuss it and get feedbacks.

Such possibility of purchasing method will increase drastically certainty of any purchase and reduce future requests for refund It is also will increase traffic across social networks and involvement large population of potential customers in social networking.

Figure 6:
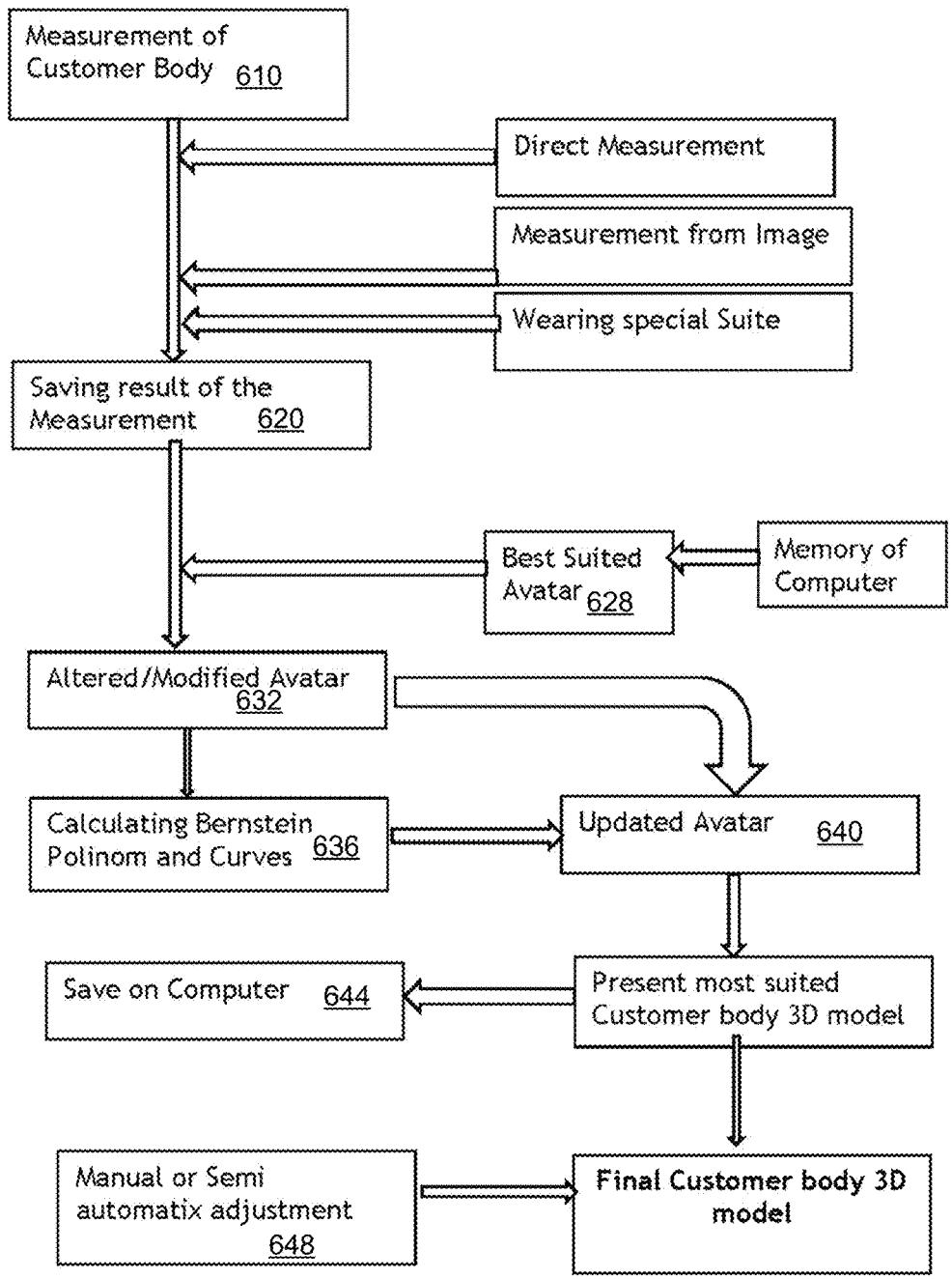
FIGS. 6 and 7 are examples of methods.

FIG. 6 illustrates method 600 for creation of 3D Model of human body of potential customer.

Method 600 may start by step 610 of performing a measurement of various human body elements by any of measurement means.

For example:
a. Direct measurement each element of human body by scales, available industrial stand alone and mobile measurement devices.
b. performing Image and border/boundaries recognition on/from an image, acquired by any imaging means, including but not limited Visible light, Infra-Red and/or Near InfraInfra-Red.
c. Wearing of specially manufactured overall part [seating very tight on the potential customer body]. This overall part has square or rectangular print. The measurement concludes: (a) Imaging of the human/potential customer body with this overall on it, (b) Recognizing borders of square or rectangular print, and (c) measurement the X and Y size of each square or rectangle.

Step 610 may include acquiring an image of potential customer face.

Step 610 may be followed by step 620 of saving the results of the measurement.

The results may be saved in various data structures, including but not limited to a data base that may include all measurement results.

An example of some entries of the database may include, for example:

| # | Body Element | Measurement 1 | Measurement 2 | Measurement N | Note % |
|---|---|---|---|---|---|
| 1 | 1 | L1 | C1 | N1 | I |
| 2 | 2 | L2 | C2 | N2 | Ii |
| 3 | 3 | L3 | C3 | N3 | Iii |
| N | N | LN | CN | NN | i-n |

Any other representations may be made.

The measurements may be any one of size, radius, distance between different ends of an organ or a body part, and the like.

Step 620 may be followed by steps 628 and 632 that refer to obtaining an avatar based on some first potential customer parameters and then amending the avatar based on additional (second) potential customer parameters. It should be noted that the two steps may be merged to a single step of selecting the avatar based on all first and second parameters. The two phases allows to store a more limited number of avatars which may be modified but their storage may require less storage resources. Ant tradeoff between the number of avatars, the number of parameters used for retrieval of the avatar, a number of parameters used for adjusting the avatar can be provided. Any selection criteria for selecting an avatar and/or determining the manner that avatar should be amended and/or the evaluating of the success in evaluating the avatar may be provided.

Step 620 may be followed by step 628 of retrieving (for example from a library, stored in computer memory) a 3D model of human body (the model is referred to as an Avatar). The Avatar may be selected based on one or more criteria—for example a best matching Avatar that best suited to the potential customer type of body. The one or more criteria may include, for example gender, age, height and the like.

Step 628 may be followed by step 632 of altering (modifying) the retrieved Avatar to the results of real measurements of potential customer.

The method may proceed by step 636 of entering the DB representing results of real measurement of potential customer body into a Bernstein basis polynomials Steps 632 and 636 may be followed by step 640 of calculating a new version of Avatar, altered by Bezier curve, based on the results of Bernstein basis polynomials calculation of step 636.

This final version of the Avatar provides far better representation [fine] of the potential customer body.

These steps (636, 640, and further illustrated steps 636 and 640) amount in entering multiple point [inputs] into the Bernstein polynomial (Maybe we should use this wording for both steps 636, 640, 770 and 780). This better adjusts the amended avatar to the customer body' 3D model.

Thus method 600 and 700 involve measurement, picking up the best suited avatar, altering the avatar by real measurement data and amending this already altered avatar by Bernstein polynomic and Bezier curves.

Step 640 may be followed by step 644 of storing the final version of the avatar.

The final version of the avatar may be presented to the potential customer and/or be manually or semi-automatically adjusted (step 648).

Figure 7:
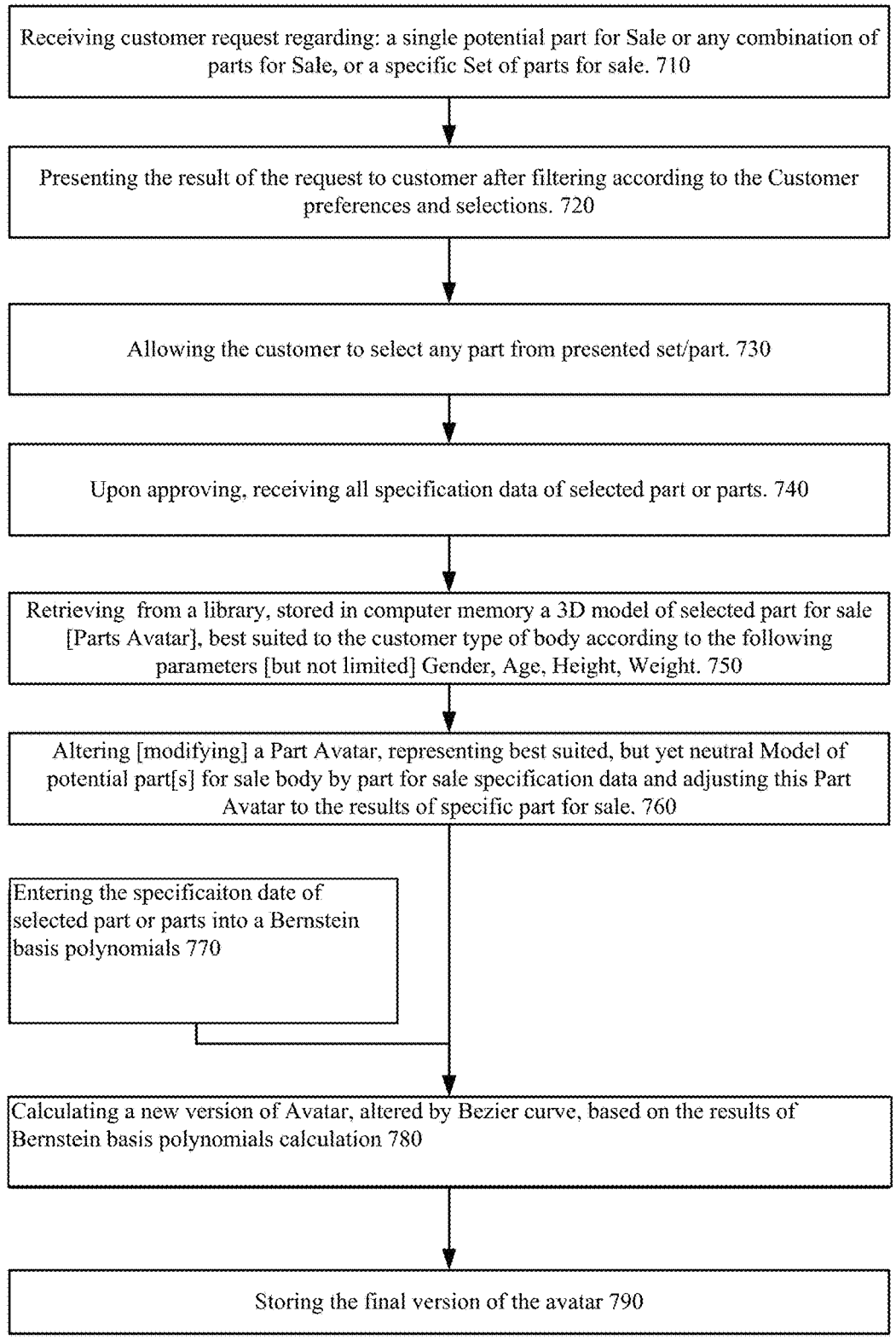

FIG. 7 illustrates method 700 for creation of 3D Model of potential Part for Sale (POS).

Method 700 may apply the same operations or different operation as applied by method 600.

Method 700 may start by step 710 of receiving customer request regarding: a single potential part for Sale or any combination of parts for Sale, or a specific Set of parts for sale.

Step 710 may be followed by step 720 of presenting the result of the request to customer after filtering according to the Customer preferences and selections.

Step 720 may be followed by step 730 of allowing the customer to select any part from presented set/part.

Upon approving, receiving (step 740) all specification data of selected part or parts.

Step 740 may be followed by step 750 of achieving from a library, stored in computer memory a 3D model of selected part for sale [Parts Avatar], best suited to the customer type of body according to the following parameters [but not limited] Gender, Age, Height, Weight.

Step 750 may be followed by step 760 of altering [modifying] a Part Avatar, representing best suited, but yet neutral Model of potential part[s] for sale body by part for sale specification data and adjusting this Part Avatar to the results of specific part for sale.

The method may proceed by step 770 of entering the specification data of selected part or parts into a Bernstein basis polynomials Steps 760 and 770 may be followed by step 780 of calculating a new version of Avatar, altered by Bezier curve, based on the results of Bernstein basis polynomials calculation of step 770.

This final version of the Avatar provides far better representation [fine] of the selected parts of sale.

Step 780 may be followed by step 790 of storing the final version of the avatar.

Step 780 may also be followed by presenting on a computer display a new version of the modified Part Avatar, achieved as result of manipulations.

After the successful execution of methods 600 and 700 the following steps of presenting the 3D model of customer and potential part of sale may be executed:
 a. Presenting on the computer display two 3D models separately and it overlapping:
  i. Of customer body, received as results of method 600.
  ii. Of Potential part[s] for sale, received as results of method 700.
 b. Emphasizing of the differences between these two models by any means including, but not limited to colors:
  i. Red color where it's too tight
  ii. Green color where it's too loose
 c. Allowing customer to observe these two models, when a model of a part for sale is actually wear on the customer body model from any direction, angel, height or distance
 d. Allow customer to select one or more [but not limited] of the following options:
  i. Accept
  ii. Reject
  iii. Next
 e. Present combination of any parts for sale [already accepted]
  i. Save for later decision
  ii. Get $3^{rd}$ party Expert opinion
  iii. Share across social and communication network
  iv. Save and perform customer selection.
 f. Communicate with shop/warehouse, where selected part[s] for sale are located [stored]
 g. Proceed to standard payment and shipment procedure
 h. Allow customer to select another part for Sale and proceed accordingly Step 780 may be followed by step 790 of storing the final version of the avatar.

Step 780 may also be followed by presenting on a computer display a new version of the modified Part Avatar, achieved as result of manipulations.

Referring to the Bernstein polynomials—the Bernstein Polynomials are incredibly useful mathematical tools as they are simply defined, can be computed very quickly on computer systems, and can represent a variety of functions. They can also be integrated easily and pieced together to form spline curves that can approximate any function to any accuracy desired. Most students face polynomials for the first time at a very early stage of their studies and most likely recall them in the form:

$$P(t)=a_0+a_1t+ \ldots +a_{n-1}t^{n-1}+a_nt^n$$

This polynomial represents a polynomial as a linear combination of $a_{n-i}t^{n-i}$ monomials. Notice that the set of functions $\{1, t, t^2, \ldots, t^{n-1}, t^n\}$ forms a basis for this vector space—that is, any polynomial less than or equal to "n" can be uniquely described as a linear combination of these functions.

In order to discuss approximations to functions and curves later on in our notes, we first need to understand a specific commonly used basis for the space of polynomials, the Bernstein basis (named after Russian mathematician Sergei Bernstein), and discuss its many useful properties.

Bernstein basis polynomials A Bernstein basis polynomial of degree "n" is defined by $$b_{i,n}(t) = \binom{n}{i} t^i (1-t)^{n-i},$$

$$i = 0, \ldots, n$$

$$\binom{n}{i} = \frac{n!}{i!(n-i)!}$$

Where (n/i) is the binomial coefficient,
Often, for mathematical convenience, we set $$b_{i,n}(t) = 0 \text{ if } i < 0 \text{ or } i > n,$$

A linear combination Bernstein basis polynomials is called a Bernstein polynomial of degree n where "b" are the Bernstein coefficients $$B_n(t) = \sum_{i=0}^{n} \beta_i b_{i,n}(t)$$

After the successful execution of methods 600 and 700 the following steps of presenting the 3D model of customer and potential part of sale may be executed.

Figure 9:
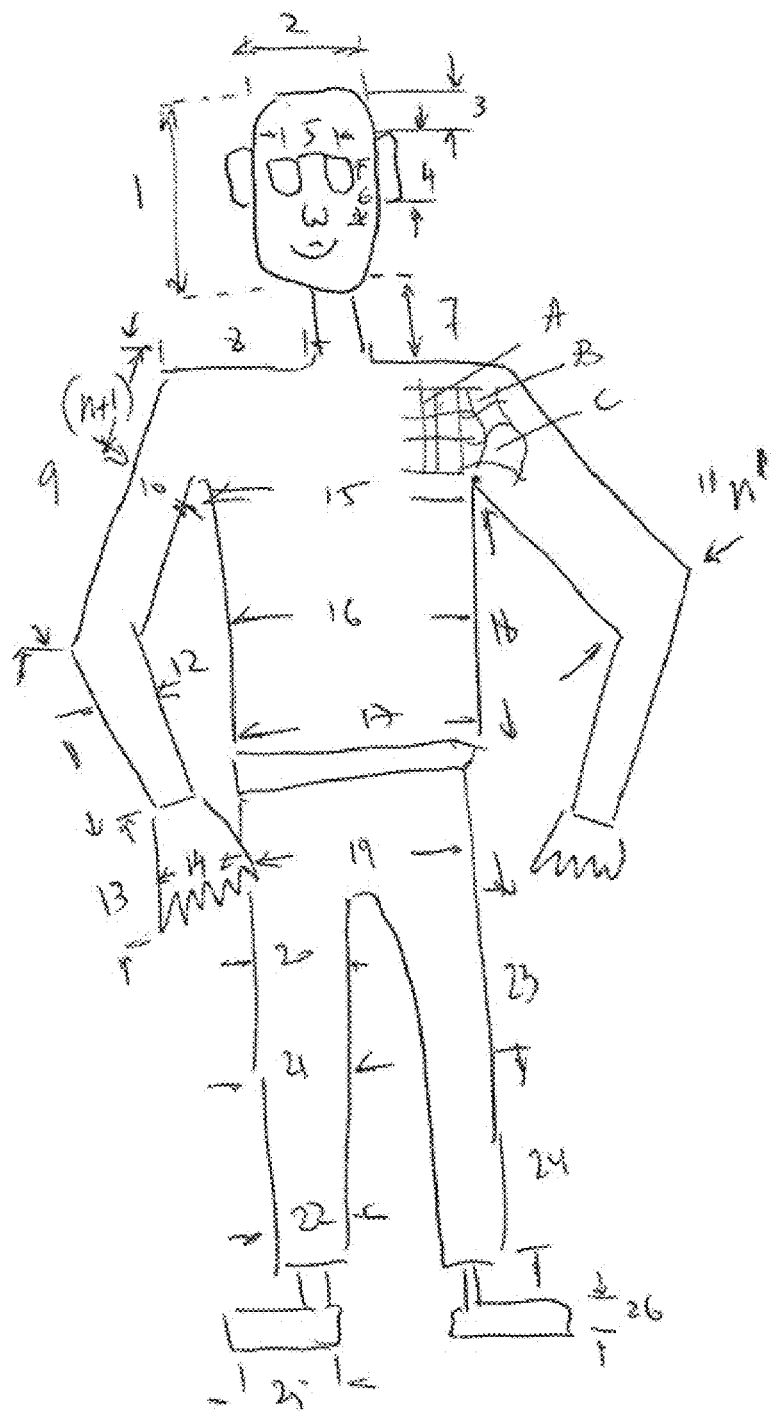
FIGS. 9 and 10 illustrate various body parts and measurements.
Figure 10:
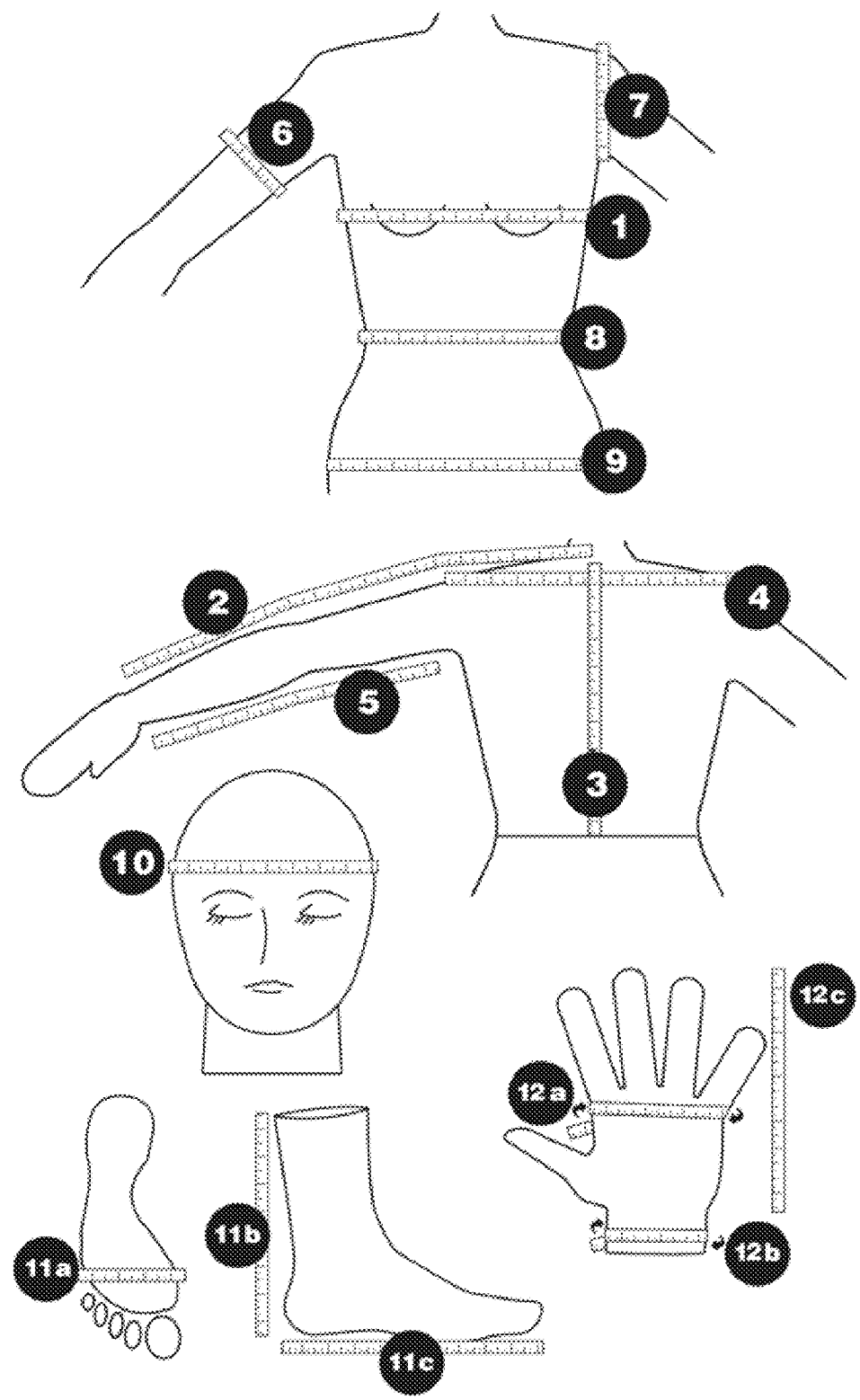

FIG. 8 illustrates method 800. The method includes generating or receiving one or more models such as (a) a final 3D model of a customer body, and (b) a 3D model of the part of sale. This is followed by presenting the two models—separately or overlapping each other. This may be followed by emphasizing difference between the two 3D models. This may be followed by a decision—how to respond to the differences—which may be followed by saving the decision and/or any information regarding the 3D models, and or may be followed by processing with the purchase. These steps may be followed by repeating the process for the next part. FIGS. 9 and 10 illustrate various body parts and measurements.

The method may be executed by a computer readable medium that stores instructions that cause the computer to execute the method.

The method may be executed by a three dimensional printer, by a computer that sends printing instructions to a three dimensional printer, and the like.

Any reference to a system should be applied, mutatis mutandis to a method that is executed by a system and/or to a computer program product that stores instructions that once executed by the system will cause the system to execute the method. The computer program product is non-transitory and may be, for example, an integrated circuit, a magnetic memory, an optical memory, a disk, and the like.

Any reference to method should be applied, mutatis mutandis to a system that is configured to execute the method and/or to a computer program product that stores instructions that once executed by the system will cause the system to execute the method.

Any reference to a computer program product should be applied, mutatis mutandis to a method that is executed by a system and/or a system that is configured to execute the instructions stored in the computer program product.

The term "and/or" is additionally or alternatively.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

The phrase "may be X" indicates that condition X may be fulfilled. This phrase also suggests that condition X may not be fulfilled. For example—any reference to a system as including a certain component should also cover the scenario in which the system does not include the certain component.

The terms "including", "comprising", "having", "consisting" and "consisting essentially of" are used in an interchangeable manner. For example—any method may include at least the steps included in the figures and/or in the specification, only the steps included in the figures and/or the specification. The same applies to the system and the mobile computer.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an."

The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Any combination of any component of any component and/or unit of system that is illustrated in any of the figures and/or specification and/or the claims may be provided.

Any combination of any system illustrated in any of the figures and/or specification and/or the claims may be provided.

Any combination of steps, operations and/or methods illustrated in any of the figures and/or specification and/or the claims may be provided.

Any combination of operations illustrated in any of the figures and/or specification and/or the claims may be provided.

Any combination of methods illustrated in any of the figures and/or specification and/or the claims may be provided.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

I claim:

1. A method for three-dimension (3D) based shopping, the method comprises:
    generating a 3D representation of at least a part of a body of a certain customer by placing a wearable overall that is equipped with sensors on the certain person; wherein the wearable overall is a one-time disposable wearable overall that does not include the sensors, wherein the method comprises providing equipping the wearable overall sensors during a measurement related to the generation of the 3D representation of the at least part of the body of the certain customer and removing the sensors after the measurement;
    receiving a query to find a first wearable item that differs from a shoe and fits the part of the body;
    receiving a preference of the certain customer regarding an allowed variation between the 3D representation and the first wearable item;
    searching for the first wearable item to provide one or more suggested first wearable item, wherein each suggested first wearable item either (i) fully matches the part of the body, or (b) partially matches the part of the body and exhibit up to the allowed variation from the part of the body;
    displaying on a display that is accessible to the certain customer a 3D model of the one or more suggested first wearable item when worn over the part of the body; wherein a suggested first wearable item that partially matches the part of the body is displayed with all adjustment of the suggested first wearable item that are required for obtaining the full match to the part of the body;
    receiving a selection of the first wearable item out of the one or more suggested first wearable items; and
    completing the 3D based shopping.

2. The method according to claim 1 wherein the at least part of the body comprises the part of the body and at least one other part of the body; wherein the method comprises searching, without an explicit request from the user and following a finding of the first wearable item, for at least one additional wearable item that may fit the at least one other part of the body; and displaying on the display a 3D model of the at least one additional wearable item when worn over the at least one other part of the body.

3. The method according to claim 2 wherein the searching for the at least one additional wearable item comprises searching for at least one additional wearable item that are associated with the first wearable item.

4. The method according to claim 3 comprising searching, without an explicit request from the user and, for non-worn items associated with the first wearable item and displaying information about the non-worn items to the user.

5. The method according to claim 3 wherein the at least one additional wearable item and the first wearable item are based on an identity of a vendor that supplies the first wearable item.

6. The method according to claim 1 wherein the interacting comprises receiving feedback from the certain customer and updating a certain customer profile based on the feedback.

7. The method according to claim 1 wherein the searching is based on a certain customer profile.

8. The method according to claim 1 wherein the searching comprises comparing dimensional information related to the first wearable item and to dimensional information related to the part of the body of the certain customer.

9. The method according to claim 1 wherein the searching comprises utilizing machine learning processes.

10. The method according to claim 1 wherein all the adjustment of the suggested first wearable item are displayed in text and color.

11. The method according to claim 1 wherein the first wearable item is a configurable wearable item; and wherein the method comprises configuring, upon completion of the 3D based shopping, the first wearable item to fit the part of the body of the certain customer.

12. The method according to claim 1 wherein the first wearable item is a 3D printer generated wearable item; and wherein the method comprises 3D printing, upon completion of the 3D based shopping, the first wearable item to fit the part of the body of the certain customer.

13. The method according to claim 1 wherein the displaying of the 3D model of the first wearable item when worn over the part of the body comprises using virtual reality.

14. The method according to claim 1 wherein the displaying of the 3D model of the first wearable item when worn over the part of the body comprises using augmented reality.

15. The method according to claim 1 comprising creating one or more two-dimensional images of the 3D model.

16. The method according to claim 1 wherein the 3D representation of the at least part of the body is a 3D representation of multiple parts of the body and wherein the query is for finding one or more wearable items that fit any of the multiple parts of the body.

17. The method according to claim 1 wherein the query implicitly states a type of the first wearable item.

18. The method according to claim 1 wherein the query comprises a fit parameter between the first wearable item and the at least part of the body.

19. The method according to claim 1 wherein the fit parameter is indicative of how tight the first wearable item will fir the at least part of the body.

20. The method according to claim 1 wherein the modifying comprises representing the measurements of the certain customer by Bernstein basis polynomials.

21. The method according to claim 1 wherein the modifying comprises modifying the avatar using Bezier curves.

22. The method according to claim 1 comprising amending, by self-learning routines, the preference of the certain customer regarding the allowed variation between the 3D representation and the first wearable item.

23. The method according to claim 1 comprising receiving a request from the certain customer to perform all the adjustments before shipping.

24. The method according to claim 1 comprising receiving a preference of the certain customer regarding a durability of the first wearable item.

25. The method according to claim 1 comprising receiving a preference of the certain customer regarding a softness of the first wearable item.

26. The method according to claim 1 comprising receiving a preference of the certain customer regarding a thickness of the first wearable item.

* * * * *